Patented Jan. 5, 1937

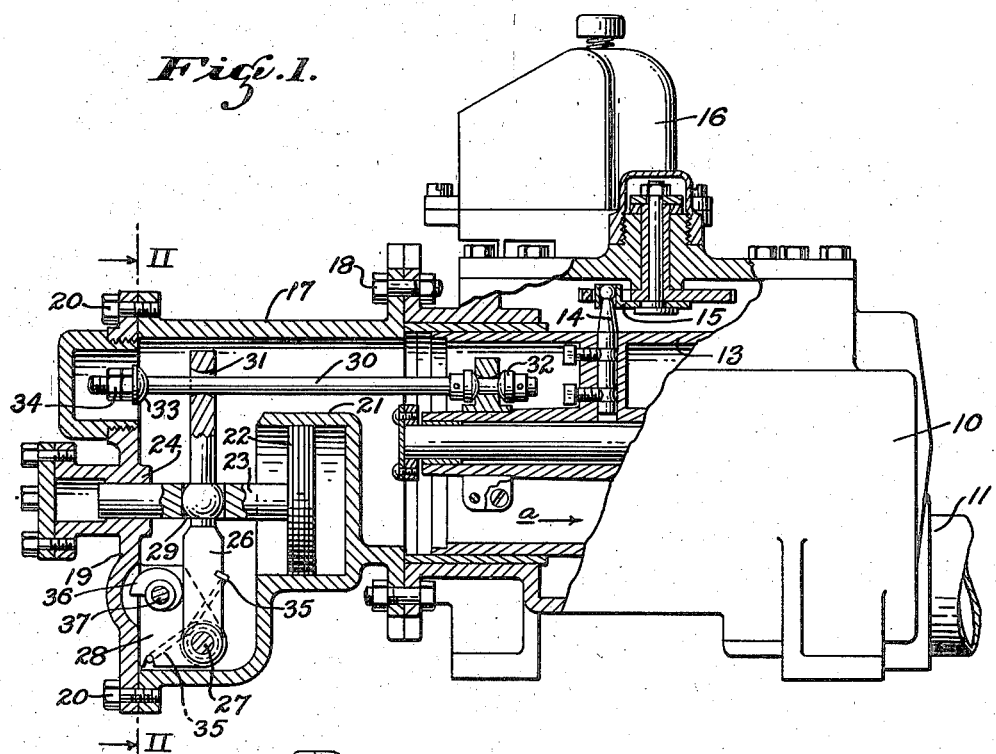
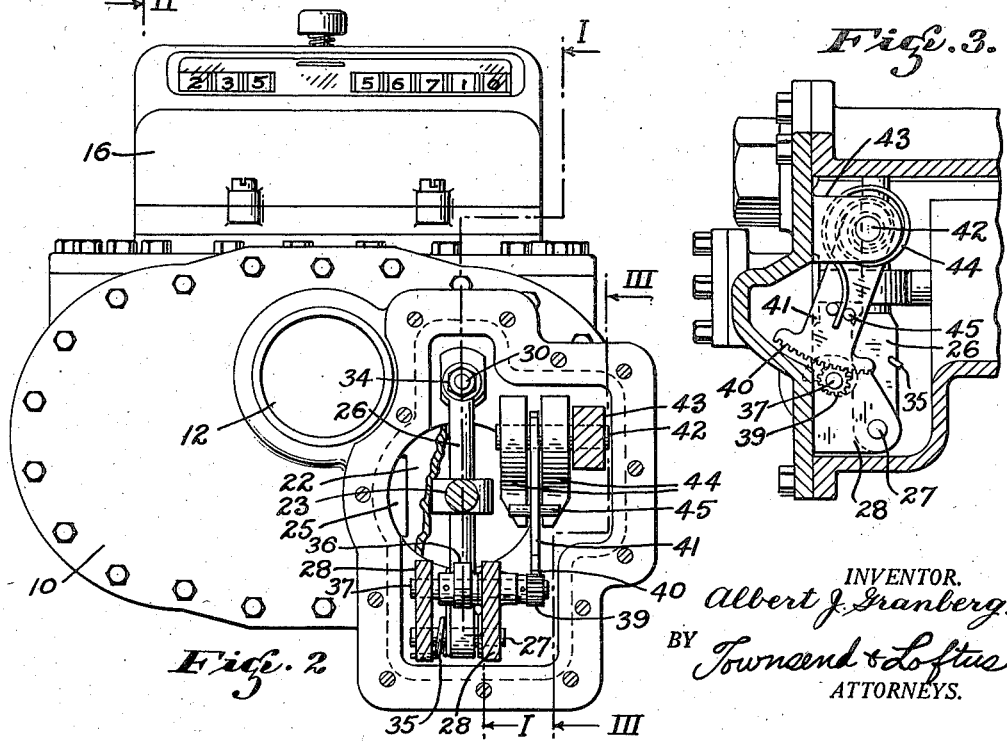

2,066,972

UNITED STATES PATENT OFFICE 2,066,972

THERMOSTATIC COMPENSATING DEVICE FOR FLUID METERS

Albert J. Granberg, Berkeley, Calif.

Application August 2, 1933, Serial No. 683,317

3 Claims. (Cl. 73—239)

This invention relates to fluid meters and more particularly to improvements in meters of the type disclosed in my prior Patent 1,811,789 for "Fluid meter" issued June 23, 1931. The improvements are in the nature of means for compensating for changes in volume of the fluid being metered caused by temperature variations.

It is the object of the present invention to provide an improved meter which comprises means actuated by variations in the temperature of the fluid being metered to compensate for volume changes caused by said temperature variations and to provide a meter in which said compensating means are simple in construction, accurate in operation, and capable of adjustment for use with various types of fluids.

This object is obtained by the combination of a meter of the positive displacement type and of means associated with one of the pistons of the meter for injecting a predetermined volume of liquid into the discharge line of the meter upon the discharge stroke of the piston. This means consists of an auxiliary piston connected with the main piston of the meter for reciprocation therewith. Means are provided for varying the stroke of the auxiliary piston so that the volume of fluid injected by it into the discharge line will be changed, and this means is actuated by a thermosensitive device immersed in the fluid being metered.

One form of my invention is exemplified in the accompanying drawing and described in the following specification in which further of its objects and advantages are made apparent.

In the drawing—

Fig. 1 is a view partly in vertical longitudinal section of a meter embodying my invention, and is taken on the line I—I of Fig. 2;

Fig. 2 is an end view of the same meter with a portion thereof shown in section on the line II—II of Fig. 1; and Fig. 3 is a fragmentary sectional view taken on the line III—III of Fig. 2.

Referring more particularly to the drawing, I show a meter casing 10, at one end of which is an inlet port 11 and at the opposite end a discharge port 12. Within the casing 10 are a pair of pistons mounted for reciprocal and oscillatory movement, one of which is shown at 13. The fluid to be metered is delivered to the interior of the meter housing at opposite ends of the pistons through ports in the cylinder walls surrounding the pistons, which are opened and closed by reciprocal and oscillatory movement of the pistons in a manner to effect metering of the fluid. Each of the pistons is provided with a crank pin such as is indicated at 14, which rotates a crank 15 and the motion of this crank is transmitted through suitable mechanism not shown to operate a counting and totalizing device situated within the casing 16 surmounting the meter casing 10. As all of the structure above referred to is disclosed in my above mentioned patent, further detailed description of the same will be unnecessary for an understanding of the present invention.

One end of the meter casing 10 is provided with an opening adjacent the discharge port 12, and a housing 17 is fitted over this opening and secured in place by means of bolts, as indicated at 18. A cover plate 19 is secured to the housing 17 by screws 20. As the housing is fitted over an opening adjacent one end of the piston 13, it is obvious that its interior will be filled with fluid which enters the meter through the intake 11. Formed within the housing 17 is a small auxiliary cylinder 21 for the reception of an auxiliary piston 22 which is reciprocally mounted therein and provided with a stem 23 guided in a bearing 24 formed in the cover plate 19. When the meter is in operation, fluid entering through the intake 11 is directed first to one end of the piston 13 to urge it in one direction and thence to the other end to urge it in the opposite direction. Each phase of this reciprocal movement of the piston serves to expel the fluid from the end to which it was last directed through suitable ports and finally out through the discharge port 12.

Upon each stroke of the piston 13 toward the closed end of the auxiliary cylinder 21, it incidentally pumps a small amount of fluid from the cylinder 21 into the discharge line. The cylinder 21 communicates with the discharge line through a port 25 in the closed end of the cylinder 21, which port is illustrated in Fig. 2 where the piston 22 is shown as broken away to disclose the same. The volume of fluid thus injected into the discharge line by the piston 22 is not taken into consideration in computing the normal displacement of the meter because the fluid so pumped was withdrawn from the discharge of the meter and consequently the reading of the counting mechanism will be accurate. The means for reciprocating the piston 22 are as follows:

A lever 26 pivoted to a pin 27 supported in a bracket 28 on cover plate 19 extends upwardly through a hole 29 formed in the stem 23 of the piston. A connecting rod 30 is slidably received by a hole 31 in the upper end of the lever 26 and connected at one end by means of a universal connection 32 with the piston 13. The opposite end of the connecting rod 30 is fitted with a collar 33 held in a position of adjustment longitudinally of the connecting rod 30 by means of lock nuts 34. A spring 35 normally urges the lever 26 to withdraw the piston 22 and movement of the main piston 13 in the direction of the arrow "a" causes the collar 33 to engage the lever 26 and move the piston 22 into its cylinder. Therefore, when the main piston is reciprocating, the auxiliary piston 22 reciprocates synchronously, being pulled in by means of the connecting rod 30 and pulled out under the tension of the spring 35. As long as the temperature of the fluid being metered remains constant, the volume of fluid injected by the auxiliary piston into the discharge line upon each stroke remains the same. When the temperature of the fluid changes, means are provided for varying the stroke of the auxiliary piston 22 and thereby changing the volume injected by it into the discharge line so as to compensate for the change of temperature.

The stroke of the piston 22 is changed by means of a cam 36 which is disposed in a position obstructing the swinging movement of the lever 26. The cam 36, which is of a generally spiral shape, is fixed to a shaft 37 journaled in the brackets 28 so that upon rotation of the shaft 37 the point on the cam which engages the lever will be advanced or retracted to determine the distance of withdrawal of the piston 22 under the tension of the spring 35. One end of the cam shaft 37 is fitted with a gear 39, and this gear meshes with a segmental rack 40 carried at the end of a lever 41 which is pivoted on a pin 42 fixedly supported in a bracket 43 formed on the cover plate 19.

Fixed to the pin 42 on opposite sides of the lever 41 are a pair of thermosensitive elements 44. These elements, which may be in the form of the conventional bi-metallic strips manufactured for this purpose, are secured at one end to the shaft 42 curved about the shaft in a helical path and terminate at their opposite ends between a pair of pins 45, which pins secure them with relation to the lever 41. The interior of the housing 17, as before stated, is filled with the fluid being metered, and the thermosensitive elements 44 are therefore immersed in said fluid and assume its temperature. Consequently, upon variations in temperature of the fluid, the elements 44 expand and contract and in so doing their outer ends swing the lever 41 about its pivot 42 with the result that the rack 40 rotates the gear 39 to change the position of the cam 36. The thermosensitive elements 44 are resilient and they are preferably arranged at slightly different degrees of tension to eliminate lost motion which would otherwise be possible upon movement of the lever 41 in opposite directions.

In order to adjust the meter for use with fluids having different coefficients of expansion, the effective length of the connecting rod 30 may be changed by adjustment of the position of the nuts 34.

In the operation of the device, the meter, as above described, is connected with a source of fluid supply to receive fluid therefrom through the intake 11. The fluid reciprocates the meter pistons and the reciprocation of the pistons discharges the fluid in measured quantities through the discharge port 12. In order to understand the operation of the auxiliary piston 22, it must be pointed out that when the main piston 13 moves in the direction of the arrow a, it is on its intake stroke so that fluid will flow into the metering chamber at the left-hand end of the piston 13, Fig. 1, from the inlet of the meter, seeking to fill this chamber. Toward the end of the intake stroke of the piston 13 in the direction of the arrow a, the collar 33 on the connecting rod 30 engages the lever 26 to move the auxiliary piston 22 in the direction of the arrow a, Fig. 1, thus enlarging the metering chamber. The port 25 enables any fluid between the auxiliary piston 22 and the end of the auxiliary cylinder 21 to be discharged into the discharge line of the meter.

Assuming now that the piston 13 has travelled the full distance of its intake stroke in the direction of the arrow a, Fig. 1, and that the connecting rod 30 through the medium of the collar 33 has moved the lever 26 forwardly to advance the auxiliary piston 22 in the auxiliary cylinder 21, when the piston 13 commences moving in the opposite direction, or in its discharge stroke, the piston 22 will likewise be urged in this direction by the spring 35. Thus, the volume of fluid discharged from the metering chamber will be the combined displacement of the main piston 13 and the auxiliary piston 22.

It is immaterial whether or not fluid is drawn from the discharge line by the suction of the auxiliary piston 22 through the port 25, because this amount drawn in will be subsequently discharged back into the discharge line so that there will be no inaccuracy. However, due to the fact that the displacement stroke of the auxiliary piston 22 is automatically varied by the temperature of the liquid being metered, the combined displacement of the main piston 13 and the auxiliary piston 22 will be varied to compensate for temperature changes.

It is seen that the spring 35 is the medium which moves the piston to the left, Fig. 1, on its displacement stroke, and this displacement stroke is not limited in any manner by the action of the piston 13, but is limited by the position of the cam 36, the position of which cam is controlled by the thermosensitive elements 44 through the lever 41 and the gear 39. Thus, the combined displacements of the pistons 13 and 22 is directly proportional to the temperature of the fluid being metered, and the accuracy of the meter is unaffected by variations in temperature. The stem 23 and the bearing 24 act as a sort of a dashpot medium to control the retraction of the piston 22.

From the foregoing it is apparent that I have provided a novel device which, through simple mechanical means, accurately compensates for differences in temperature of fluid passing through a meter of positive displacement type.

While I have shown a preferred form of my invention, it will be understood that various changes may be made in the construction and arrangement of its several parts within the scope of the appended claims.

Having thus described my invention, what I claim and desire to secure by Letters Patent is:

1. In combination with a fluid meter comprising a reciprocable metering piston and adapted to be connected with a supply line and a discharge line, a chamber adjacent the meter and in communication with the meter, a cylinder in said chamber communicating with the discharge line, an auxiliary piston in said cylinder resilient means normally holding the auxiliary piston withdrawn, means connecting the auxiliary piston with the metering piston whereby the auxiliary piston will be advanced upon each reciprocal stroke of the metering piston to inject fluid into the discharge line, and temperature responsive means for varying the stroke of the auxiliary piston to compensate for variations in temperature of the fluid.

2. In combination with a fluid meter comprising a reciprocable piston and adapted to be connected with a supply line and a discharge line, a chamber adjacent the meter and adapted to be in communication with the meter, a cylinder in said chamber communicating with the discharge line, an auxiliary piston in said cylinder, a spring pressed lever pivoted within said chamber and connected with said auxiliary piston to normally urge it to a withdrawn position, a connecting rod carried by the metering piston and slidably extending through said lever, a collar on said rod to engage the lever and advance the auxiliary piston upon movement of the metering piston in one direction to cause the auxiliary piston to inject a quantity of fluid into the discharge line, a cam engaging said lever to limit the withdrawal of the auxiliary piston and thereby control the quantity of fluid injected into the discharge line by it, and a thermosensitive element immersed in the fluid in said chamber to vary the position of said cam upon variations in temperature of the fluid.

3. In combination with a fluid meter comprising a reciprocable piston and adapted to be connected with a supply line and a discharge line, a chamber adjacent the meter and adapted to be in communication with the meter, a cylinder in said chamber communicating with the discharge line, an auxiliary piston in said cylinder, a spring pressed lever pivoted within said chamber and connected with said auxiliary piston to normally urge it to a withdrawn position, a connecting rod carried by the metering piston and slidably extending through said lever, a collar on said rod to engage the lever and advance the auxiliary piston upon movement of the metering piston in one direction to cause the auxiliary piston to inject a quantity of fluid into the discharge line, a cam engaging said lever to limit the withdrawal of the auxiliary piston and thereby control the quantity of fluid injected into the discharge line by it, and a thermosensitive element immersed in the fluid in said chamber to vary the position of said cam upon variations in temperature of the fluid, and means permitting adjustment of the position of said collar on said connecting rod to adapt the device to various types of fluid.

ALBERT J. GRANBERG.